US012619594B1

(12) United States Patent
Bly

(10) Patent No.: US 12,619,594 B1
(45) Date of Patent: May 5, 2026

(54) SYSTEMS AND METHODS FOR RULE-BASED DATABASE MANAGEMENT AND TAGGING

(71) Applicant: T-Mobile Innovations LLC, Overland Park, KS (US)

(72) Inventor: Terri Bly, Kirkland, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/979,590

(22) Filed: Dec. 12, 2024

(51) Int. Cl.
G06F 16/22 (2019.01)
G06F 16/2457 (2019.01)
H04L 9/06 (2006.01)

(52) U.S. Cl.
CPC .... G06F 16/2282 (2019.01); G06F 16/24573 (2019.01); H04L 9/0618 (2013.01)

(58) Field of Classification Search
CPC ............................ H04L 9/0822; H04L 9/0618
See application file for complete search history.

(56) References Cited

U.S. PATENT DOCUMENTS

| 7,539,682 | B2 * | 5/2009 | Rubin | ................. | G06F 21/6227 |
| | | | | | 707/999.009 |
| 8,813,247 | B1 * | 8/2014 | Alten | ................... | H04L 9/0637 |
| | | | | | 726/28 |
| 11,392,714 | B1 * | 7/2022 | Matthews | ............. | H04L 9/0894 |
| 11,546,381 | B1 * | 1/2023 | Zhang | ................... | H04L 63/105 |
| 2010/0161995 | A1 * | 6/2010 | Browning | ............. | H04L 9/0891 |
| | | | | | 713/189 |
| 2017/0208088 | A1 * | 7/2017 | Molloy | ............. | G06F 16/24573 |
| 2021/0374145 | A1 * | 12/2021 | Myers | ............... | G06F 16/24573 |
| 2023/0359770 | A1 * | 11/2023 | Mcfall | .................. | H04L 9/3247 |

FOREIGN PATENT DOCUMENTS

WO WO-2023200534 A1 * 10/2023 ......... G06F 21/6245

OTHER PUBLICATIONS

"Bly, Terri, et al., ""Methods and Systems for Data Platform Monitoring and Auditing,"" filed Mar. 28, 2024, U.S. Appl. No. 18/620,519."
Bly, Terri, et al., "Ciphertext Header-Based Data Security," filed May 21, 2024, U.S. Appl. No. 18/670,692.

* cited by examiner

*Primary Examiner* — William P Bartlett

(57) ABSTRACT

A method comprises generating a ciphertext rule defining a column tag when at least a subset of digits in a ciphertext stored in a column of a table matches predefined ciphertext digits associated with at least one of a first purpose, a first type, or a first sensitivity of column data in the column, generating, by the rule application, a table rule defining a table tag when the table includes the column that is tagged with the column tag, wherein the table tag labels the table as being associated with at least one of a second purpose, a second type, or a second sensitivity of table data in the table, and tagging, by a tag application executing at the database management system, the column with the column tag based on the ciphertext rule and the table with the table tag based on the table rule.

19 Claims, 6 Drawing Sheets

300

400

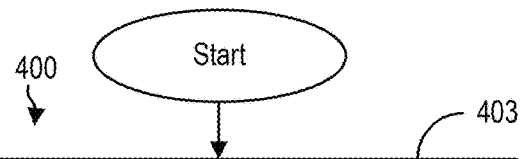

Start

403

Maintaining, at a data store in the communication network, ciphertext data including mappings between predefined ciphertext digits and one or more data attributes, wherein the one or more data attributes comprise at least one of an identification of an encryption key, an identification of an encryption attribute, or an identification of a type of data

405

Identifying, by a rule application executing at a database management system in the communication network, a term associated with data elements at one or more tables comprising one or more columns in one or more databases of the communication network

407

Generating, by the rule application, a cleartext rule for the term, wherein the cleartext rule defines a first column tag based on a format in which data associated with the term is stored in the one or more columns

409

Generating, by the rule application, a ciphertext rule for the term, wherein the ciphertext rule defines a second column tag when at least a subset of digits in a ciphertext stored in the one or more columns matches the predefined ciphertext digits

411

Generating, by the rule application, a table rule defining a table tag for each of the one or more tables based on the second column tag of the one or more columns at the one or more tables

413

Tagging, by a tag application executing at the database management system, a column at a table with the second column tag based on the ciphertext rule and the ciphertext included in the column by storing the second column tag in association with the column in the data store

415

Tagging, by the tag application, the table with the table tag based on the table rule and the second column tag of the column in the table by storing the table tag in association with the table in the data store

417

Responding, by the tag application, to a database query using the table tag and the second column tag End

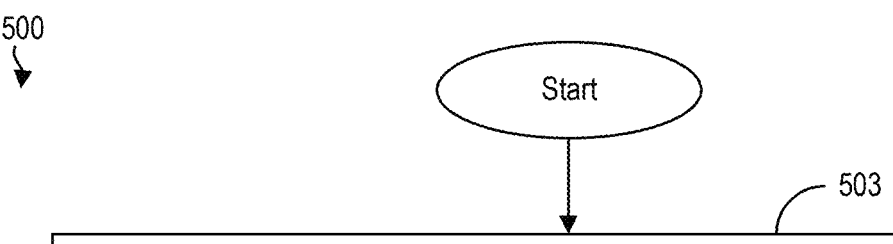

Start

503

Generating, by a rule application executing at a database management system, a ciphertext rule defining a column tag when at least a subset of digits in a ciphertext stored in a column of a table matches predefined ciphertext digits associated with at least one of a first purpose, a first type, or a first sensitivity of column data in the column

505

Generating, by the rule application, a table rule defining a table tag when the table includes the column that is tagged with the column tag, wherein the table tag labels the table as being associated with at least one of a second purpose, a second type, or a second sensitivity of table data in the table

507

Tagging, by a tag application executing at the database management system, the column with the column tag based on the ciphertext rule and the table with the table tag based on the table rule

509

Responding, by the tag application, to a database query using the table tag and the column tag End

384 — Secondary Storage

CPU

388 — RAM

386 — ROM

Network — 392

SYSTEMS AND METHODS FOR RULE-BASED DATABASE MANAGEMENT AND TAGGING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Database management platforms have been introduced to enhance data quality, governance, and observability across enterprise data platforms. The database management platforms may be used for a variety of purposes to enable seamless workflows, automate data monitoring, and resolve quality issues with minimal manual intervention. For example, applications data management platforms may perform data quality checks, anomaly detection, and compliance monitoring, to help businesses enforce governance policies and extract actionable insights efficiently.

SUMMARY

In an embodiment, a method implemented in a communication network to perform database management and tagging is disclosed. The method comprises maintaining, at a data store in the communication network, ciphertext data including mappings between predefined ciphertext digits and one or more data attributes, in which the one or more data attributes comprise at least one of an identification of an encryption key, an identification of an encryption attribute, or an identification of a type of data, and identifying, by a rule application executing at a database management system in the communication network, a term associated with data elements at one or more tables in one or more databases of the communication network, in which the one or more tables each comprise one or more columns. The method further comprises generating, by the rule application, a cleartext rule for the term, in which the cleartext rule defines a first column tag based on a format in which data associated with the term is stored in the one or more columns, generating, by the rule application, a ciphertext rule for the term, in which the ciphertext rule defines a second column tag when at least a subset of digits in a ciphertext stored in the one or more columns matches the predefined ciphertext digits, and generating, by the rule application, a table rule defining a table tag for each of the one or more tables based on the second column tag of the one or more columns at the one or more tables. The method further comprises tagging, by a tag application executing at the database management system, a column at a table with the second column tag based on the ciphertext rule and the ciphertext included in the column by storing the second column tag in association with the column in the data store, tagging, by the tag application, the table with the table tag based on the table rule and the second column tag of the column in the table by storing the table tag in association with the table in the data store, and responding, by the tag application, to a database query using the table tag and the second column tag.

In yet another embodiment, a database management system is disclosed. The database management system includes one or more non-transitory memories, one or more processors coupled to the one or more memories, a rule application stored at one or more of the one or more memories, and a tag application stored at one or more of the one or more memories. The rule application, when executed by one or more of the one or more processors, causes the rule application to be configured to generate a ciphertext rule defining a column tag when at least a subset of digits in a ciphertext stored in a column of a table matches predefined ciphertext digits associated with a type of data, and generate a table rule defining a table tag for the table when the table includes the column that is tagged with the column tag. The tag application, when executed by one or more of the one or more processors, causes the tag application to be configured to tag the column at the table with the column tag based on the ciphertext rule when the column includes one or more data elements each including different ciphertext, wherein each of the different ciphertext includes the subset of digits matching the predefined ciphertext digits, and tag the table with the table tag after the column is tagged with the column tag.

In yet another embodiment, a method is disclosed. The method comprises generating, by a rule application executing at a database management system, a ciphertext rule defining a column tag when at least a subset of digits in a ciphertext stored in a column of a table matches predefined ciphertext digits associated with at least one of a first purpose, a first type, or a first sensitivity of column data in the column, generating, by the rule application, a table rule defining a table tag when the table includes the column that is tagged with the column tag, in which the table tag labels the table as being associated with at least one of a second purpose, a second type, or a second sensitivity of table data in the table, tagging, by a tag application executing at the database management system, the column with the column tag based on the ciphertext rule and the table with the table tag based on the table rule, and responding, by the tag application, to a database query using the table tag and the column tag.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 4 is a flowchart of a first method of rule-based database management and tagging according to various embodiments of the disclosure.

FIG. 5 is a flowchart of a second method of rule-based database management and tagging according to various embodiments of the disclosure.

DETAILED DESCRIPTION

Figure 1:
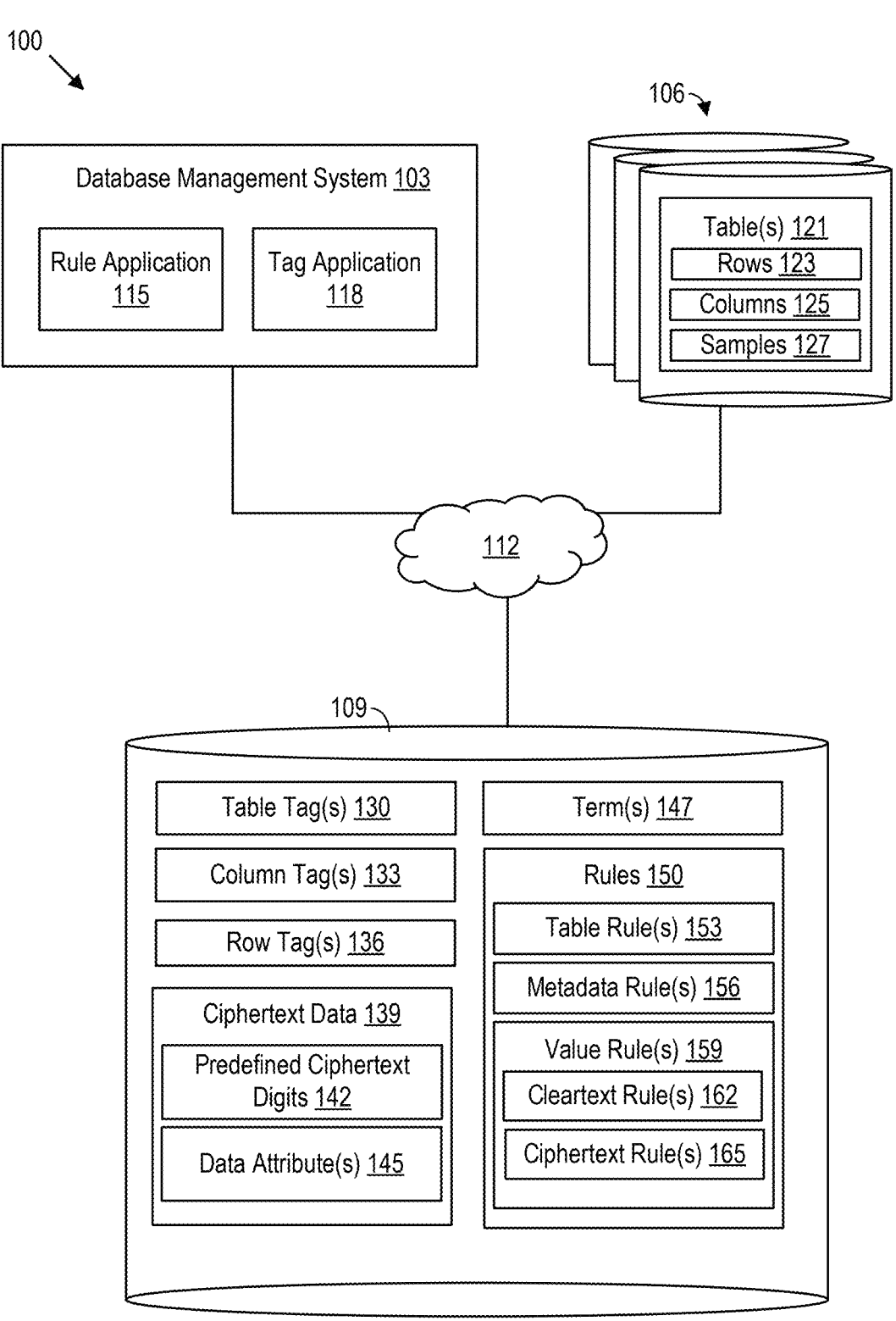
FIG. 1 is a block diagram of a communication network according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Database management platforms may be used by business enterprises to manage large-scale databases storing an extensive amount of information on behalf of the business enterprises. However, business enterprises often face challenges when data is stored inconsistently and/or incompletely across different databases, which can lead to technical inefficiencies and operational difficulties. For example, when the same type of data is stored in different formats (e.g., a social security number stored in a column of a first table with dashes and a column of a second table without dashes, or dates stored as MM/DD/YYYY in one table but as YYYY-MM-DD in another), this can lead to inaccurate query results (e.g., queries designed for one format may fail to retrieve data from another, join operations across tables can fail/produce incomplete results). Another problem may arise between different data types that are stored with the same format. For example, a column in one table may represent the date of birth, while a similar column in another table may represent the expiration date, and both columns may use the same YYYY-MM-DD format. This can lead to the misinterpretation of data (e.g., a query may assume that two similarly formatted columns represent the same type of information may lead to incorrect responses, analyses, or reports).

Both of the aforementioned database inconsistencies may lead to various other technical problems, such as, for example, increased processing overhead (e.g., additional processing may be needed to determine accurate responses to the queries/to normalize data for accurate querying), data duplication and redundancy (e.g., variations in format may lead to duplicate records being stored as different data elements), data quality issues (e.g., inconsistent formats make it difficult to enforce data validation/quality rules), inefficient data discovery, errors in data aggregation, etc. In this way, the inability of database management platforms to accurately classify or label columns and tables across databases leads a high performance overhead because query engines may have to process and transform data on the fly, using more computing power and time.

While methods of labeling columns in tables have been introduced, such methods are often manual in nature and involve a scanner application having to scan each and every column, sampling a large amount of data in the column, and making labelling decisions based on the sample, which are often incorrect (e.g., due to the aforementioned inconsistencies). Moreover, encrypted data or columns may not be labeled accurately, if at all, due to the inability of the scanner application to understand the encrypted data to evaluate the data and make a label determination.

The present disclosure addresses the foregoing technical problems by providing a technical solution in the technical field of database management and database querying, by introducing systems and methods of rule-based database management and tagging. The systems and methods disclosed herein are directed to tagging columns and tables across databases with tags that label or classify the type of data stored at the columns and tables based on the formats and values in the columns, while also enabling columns with encrypted data to be tagged based on digits or characters of the ciphertext included in the columns, as further described herein. In this way, the embodiments disclosed herein serve to label columns and tables with tags that can be used to increase the accuracy and efficiency by which systems respond to database queries, and enables encrypted data to be labeled for similar uses.

The term "ciphertext" as used herein refers to data that has been encrypted using an encryption algorithm and an encryption key, transforming data from original plaintext or cleartext into an unreadable format to protect the confidentiality of the data. The term "ciphertext" may also refer to encrypted data elements stored within specific rows and columns of one or more tables across one or more databases. In an embodiment, the ciphertext may include a header or footer including an encryption key identifier identifying the encryption key used to encrypt the underlying data and an encryption algorithm identifier identifying an encryption algorithm used to encrypt the underlying data. Additional detail regarding the ciphertext including the encryption key identifier and the encryption algorithm identifier is further described in U.S. patent application Ser. No. 18/670,692, entitled "Ciphertext Header-Based Data Security," by Terri Bly, et. al., which is hereby incorporated by reference in its entirety. In an embodiment, the ciphertext may include a series of alphanumeric digits (e.g., 16 alphanumeric digits), the "header" of the ciphertext may refer to a prefix or a first subset of digits in the ciphertext, and a "footer" of the ciphertext may refer to a suffix or last subset of digits in the ciphertext.

The system of rule-based database management and tagging disclosed herein includes a database management system, one or more databases storing tables with cleartext data (e.g., non-encrypted data, also referred to as plaintext data) and encrypted data, and a data store for storing the tag associations and the rules. The tables in the databases may include rows and columns, and samples of data elements may refer to a subset of data elements from the rows and/or columns that may be used to tag the row, column, and/or table.

The data store may store the metadata associating various tags of columns and/or tables with the respective associated column or table. The data store may store terms, which may refer to a concept or definition stored within a glossary that may be linked to data, such as the data elements in the databases. For instance, a term may refer to a specific data purpose or usage (e.g., customer ID, monthly revenue, etc.), data elements across various tables in the databases may store data related to a particular term, and the term may be associated with various rules as described herein to classify and label related data elements. The data store may also store ciphertext data including mappings of predefined ciphertext (or a predefined subset of digits from the ciphertext) to one or more data attributes. The data attributes may, for example, define at least one of a purpose, type, or sensitivity of data that may be encrypted into ciphertext including the predefined ciphertext. This ciphertext data may be used to create rules for tagging the tables and columns and/or rows in the tables.

The database management system may include a rule application responsible for generating various tagging rules, such as metadata rules, table rules, and value rules, for different terms. Each rule may include logic or code based on one or more conditions (e.g., when a condition regarding a sample of data from the table/column/row is met, the rule application may either perform another data evaluation step or may tag the table/column/row with a particular tag).

In an embodiment, a metadata rule may refer to logic or code with one or more conditions, that may be used to define possible column names of columns across the tables in the databases that may include data related to the term. The metadata rule may also indicate column names that may exclude data related to the term. For example, a metadata rule for the term "tax identifier" may indicate inclusionary column names, such as "TXID," "PARTNERTXID," "TXIN," etc., (e.g., the column names that likely include data associated with term), and may indicate exclusionary column names, such as ESSN, ASSN, PRCSSING, etc., (e.g., the column names that likely do not include data associated with the term). In an embodiment, the inclusionary column names and exclusionary column names may be based on user input provided to the database management system by a user. In an embodiment, the inclusionary column names and exclusionary column names may be based on a dictionary defining different column names and the specific types of data stored at the respective columns. While the above example is described in terms of column names and columns, it should be appreciated that metadata rules may also be defined for row names and rows. Once a column is determined to pass a metadata rule (e.g., the conditions of the metadata rule are true for the column), the rule application may proceed to apply the value rules corresponding to the term of the metadata rule.

The value rules may include cleartext rules and ciphertext rules for different terms. That is, for a term (e.g., a category or type of data), the database management system may be programmed with cleartext rules for cleartext data (i.e., plaintext data) and ciphertext rules for encrypted data. In an embodiment, a cleartext rule for a term may refer to logic or code with one or more conditions, that may be used to define a column tag for a column based on a format in which data associated with the term is stored across columns (or rows) in the tables stored at the databases. For example, the cleartext rule may specify that when samples received from columns include 9-digit numbers or 8-digit numbers, each with a value between 0 and 9, then the rule application may tag the column with a predefined column tag (e.g., because the samples may be considered data associated with the term). Again, while the above example is described in terms of columns, it should be appreciated that cleartext rules may also be defined in terms of rows using samples received from rows, to tag a row with a row tag.

In an embodiment, the ciphertext rule for a term may refer to logic or code with one or more conditions, that may be used to define a column tag for a column based on a sample of the ciphertext included in a column. For example, the ciphertext rule may specify that when a subset of digits in ciphertext matches predefined ciphertext digits (as stored in the ciphertext data), the rule application may tag the column with a predefined column tag (e.g., because the samples may be considered data associated with the term). Again, while the above example is described in terms of columns, it should be appreciated that ciphertext rules may also be defined in terms of rows using samples received from rows, to tag a row with a row tag.

In this way, the metadata rules may be used to obtain locations (e.g., columns) in which to find data pertaining to a term, and value rules (e.g., cleartext rules and ciphertext rules) may be used to verify whether the columns store the correct format and type of data pertaining to the term. In an embodiment, a table rule may refer to logic or code with one or more conditions, that may be used to define a table tag for a table. The table tag may define an attribute of the table as a whole based on one or more column tags of columns in the table (and/or row tags of rows in the table). In this way, the table tag more generally defines the context or broad category of data stored in a table using the column tags and/or row tags.

The rule application may define table rules based on, for example, metadata defining predefined mappings or associations between predefined column tags (and row tags) with predefined table tags. For example, the rule application may define a table rule such that when a column tag of a column tag in a table is <Customer Tax Identifier>, then the table tag may be <Customer Data> (as opposed to employee data) (the association between <Customer Tax Identifier> and <Customer Data> may be indicated in the metadata).

After the rule application has defined metadata rules, value rules (e.g., cleartext rules and ciphertext rules), and table rules for a variety of different terms based on data received from users of the data management system, ciphertext data, and/or other metadata, a tag application may perform steps to tag the columns, rows, and/or tables across the databases. In an embodiment, the tag application may first evaluate each column of each table across all of the databases and perform metadata rules for different terms to determine whether a metadata rule passes (e.g., evaluate the column names and determine whether the column name matches one that is indicated in a metadata rule). When the tag application determines that a column has passed the metadata rule (e.g., a column name of the column matches the column name indicated in the metadata rule for the term), the tag application may run the value rules.

First, the tag application may evaluate each column based on a series of cleartext rules for the term using a sample of the data elements in the column (e.g., to evaluate whether the sampled data elements includes values formatted based on the cleartext rule for the term). When the tag application determines that a column has passed a cleartext rule (e.g., the sampled data elements of the column includes values formatted as specified in the cleartext rule), the tag application may associate the column with the column tag specified in the cleartext rule (e.g., store an association between the column and the column tag in tag metadata at the data store). When the tag application determines that the column has not passed any of the cleartext rules for the term, the tag application may run the ciphertext rules on the columns.

To run the ciphertext rules, the tag application may evaluate each column based on one or more ciphertext rules for the term using a sample of the ciphertext data elements in the column (e.g., to evaluate whether the sampled ciphertext includes a subset of digits corresponding to predefined ciphertext digits included in the ciphertext data). When the tag application determines that a subset of digits of the sampled ciphertext matches predefined ciphertext digits associated with a column tag, the tag application may associate the column with the column tag specified in the ciphertext rule (e.g., store an association between the column and the column tag in tag metadata at the data store).

The tag application may also run the tag rules with respect to the tables in the databases. For each table, the tag application may run the tag rules by evaluating the column tags of each of the columns in the table to determine whether a table has one or more predefined column tags associated with a table tag. When a table has one or more predefined column tags associated with a table tag, the tag application may associate the table with the table tag specified in the table rule (e.g., store an association between the table and the table tag in tag metadata at the data store). While the example mentioned above does not mention row tags, it should be appreciated that the tag application may perform similar steps to tag rows in tables with row tags.

The column tags, table tags, and row tags may be used for various purposes. First, the tags may be used to more efficiently and accurately respond to database queries. When the tag application receives a database query directed to a particular data element or type of data, the tag application may use the tags to immediately identify relevant tables and columns (thereby ignoring irrelevant tables or columns), rather than having to scan every column or rely on hard-coded scheme knowledge. For example, a query looking for PII data may directly filter for columns tagged as <PII>, skipping irrelevant columns. Next, tags may also provide context to distinguish between columns with similar formats but different meanings (e.g., both date of birth and expiration date columns may have data in the YYYY-MM-DD format, but the tags <DOB> and <Expiration> may clarify the purpose of the columns). Similarly, the tag application may quickly locate relevant columns using tags without manually searching and interpreting column names and documentation. The use of tags may also facilitate improved compliance monitoring (e.g., to ensure that sensitive data is easily identifiable during queries) and streamlined data governance (e.g., to enforce policies based on the tags). In some cases, the column tags, table tags, and/or row tags may be passed to a data catalog, which may be used to perform operations across the tables (e.g., join operations, deduplication operations, etc.) and to respond to database queries.

In this way, the embodiments disclosed herein reduce the resources (both computing a time) that would have otherwise been involved in responding to database queries because the column tags and table tags may be used to immediately identify locations at which data relevant to the query may be found. For example, the embodiments disclosed herein reduce the processing overhead for responding to database queries, reduce data duplication and redundancies by enabling the tags to be used for join/deduplication operations, increase the efficiency of data quality monitoring by using the tags as opposed to data samples, increase the efficiencies in data discovery by using the tags, reducing errors in data aggregation by using the tags, etc. Therefore, in general, the embodiments disclosed herein serve to increase system capacity by decreasing the consumption of resources that would have been involved in responding to database queries.

Turning now to FIG. 1, a communication network 100 is described. The communication network 100 shown in FIG. 1 includes database management system 103, one or more databases 106, a data store 109, and a network 112. The network 112 may be one or more private networks, one or more public networks, or a combination thereof.

The databases 106 may be a collection of one or more distributed or co-located memories managed by the database management system 103. These databases 106 may act as central repositories for storing, retrieving, and managing data elements. The databases 106 store structured tables 121 including rows 123 (records) and columns 125 (attributes) of data elements. Each database 106 may include one or more tables 121, each table 121 may include one or more rows 123 and one or more columns 125. Each table 121, row 123, or column 125 may include samples 127 (or a select subset of data elements in the table 121, row 123, or column 125) that may be evaluated by the database management system 103, as further described herein. The samples 127 may include cleartext, non-encrypted data, and/or encrypted data in the form of ciphertext.

The database management system 103 refers to a series of hardware and software resources (e.g., memories, processors, servers, network resources, applications, software functions, etc.) used to manage and tag the tables 121, rows 123, and/or columns 125 in the databases 106. The database management system 103 includes a rule application 115 and a tag application 118, both of which may be stored in a memory of the database management system 103 and executable by a processor of the database management system 103. The rule application 115 may generate the tagging rules, and the tag application 118 may tag the tables 121, rows 123, and/or columns 125 based on the tagging rules, as further described herein. The tag application 118 may also respond to database queries and perform operations across the tables 121.

The data store 109 may be a collection of distributed or co-located memories storing data used and/or generated by the rule application 115 and the tag application 118. The data store 109 may store tag metadata, including the table tags 130, column tags 133, and row tags 136. For example, the tag metadata may describe an association of a table tag 130 to a table 121, a column tag 133 to a column 125, and/or a row tag 136 to a row 123. For example, the table tags 130 may indicate that a table 121 identified by a table identifier (or a pointer pointing to the table 121) is associated with certain table tags 130, the column tags 133 may indicate that a column 125 identified by a column identifier of a column 125 (or a pointer pointing to a column 125) is associated with certain column tags 133, and the row tags 136 may indicate that a row 123 identified by a row identifier of a row 123 (or a pointer pointing to the row 123) is associated with certain row tags 136.

For example, column tags 133A-N may include data sensitivity tags, such as, personally identifiable information (PII) tags (e.g., <email>, <SSN>, <phone number>, <address>, etc.), and protected health information (PHI) tags (e.g., <medical history>, <insurance identifier>, etc.). For example, column tags 133A-N may include data type tags, such as, numeric tags (e.g., <order amount>, <price>, etc.), text tags (e.g., <customer name>, <city>, etc.), date/time tags (e.g., <purchase date>, <login timestamp>, etc.), and categorical tags (e.g., <product category>, etc.). For example, column tags 133A-N may include business domain tags, such as, customer demographic tags (e.g., <age>, <gender>, <income>, etc.), product attribute tags (e.g., <product ID>, <weight>, <color>, etc.), and financial metrics (e.g., <revenue>, <profit>, and <expense>). For example, column tags 133A-N may include data quality tags, such as, tags indicating columns with missing values, columns that often have duplicate values, and columns flagged for unusual data points. For example, the column tags 133A-N may include, for example, marketing data tags (e.g., <campaign ID>, <conversion rate>, etc.), human resource data tags (e.g., <employee ID>, <job title>, etc.), and sales data (e.g., <sales region>, <total sales>, etc.).

The data store 109 may store ciphertext data 139, which may include mappings between predefined ciphertext digits 142 and one or more data attributes 145. The predefined ciphertext digits 142 may be a predefined number (e.g., five) of ciphertext digits 142 that may be included in ciphertext stored at the tables 121. The one or more data attributes 145 may define at least one of a purpose, type, or sensitivity of the data or type of the underlying data that may be encrypted into ciphertext including the predefined ciphertext digits 142. The one or more data attributes 145 may also indicate, for example, an environment of the ciphertext/underlying data, the encryption key identifier of the encryption key used on the ciphertext, and the encryption algorithm identifier of the encryption algorithm used on the ciphertext.

The data store 109 may store terms 147, which may refer to a concept or definition stored within a glossary that may be linked to data stored at the tables 121. For instance, a term 147 may refer to a specific category, purpose, or usage of data (e.g., customer ID, monthly revenue, etc.) and may be associated with various rules as described herein to classify and label related data elements in the tables 121.

The rules 150 may refer to logic or code with one or more conditions (e.g., when a condition regarding a sample of data from the table 121/column 125/row 123 is met, the rule application 115 may either perform another data evaluation step or may tag the table 121/column 125/row 123 with a particular table tag 130, column tag 133, and/or row tag 136). The rules 150 may include table rules 153, metadata rules 156, and value rules 159. A metadata rule 156 may refer to logic or code with one or more conditions, that may be used to define possible column names of columns 125 across the tables 121 in the databases 106 that may include data related to a particular term 147. The metadata rule 156 may also indicate column names that may exclude data related to the term 147. The value rules 159 may include cleartext rules 162 and ciphertext rules 165 for different terms 147, and the value rules 159 may be based on the samples 127 collected from the tables 121, rows 123, and/or columns 125 for evaluation. In an embodiment, each metadata rule 156 of a term 147 may be associated with one or more value rules 159. For example, the data store 109 may store a list of value rules 159 (both cleartext rules 162 and ciphertext rules 165) for each metadata rule 156 associated with a term 147, such that the rule application 115/tag application 118 may iteratively apply each of the cleartext rules 162 and/or ciphertext rules 165 of a metadata rule 156 when a column 125 matches the metadata rule 156.

A cleartext rule 162 for a term 147, for example, may refer to logic or code with one or more conditions, that may be used to define a column tag 133 (or row tag 136) for a column 125 (or row 123) based on a format in which data associated with the term 147 is stored across columns 125 (or rows 123) in the tables 121 stored at the databases 106. The ciphertext rule 165 for a term 147, for example, may refer to logic or code with one or more conditions, that may be used to define a column tag 133 (or row tag 136) for a column 125 (or row 123) based on a sample of the ciphertext included in the columns 125 (or rows 123) in the tables 121 stored at the databases 106 matching predefined ciphertext digits 142, as further described herein. A table rule 153 may refer to logic or code with one or more conditions, that may be used to define a table tag 130 defining an attribute of the table 121 as a whole based on the column tags 133 of columns 125 in the table 121 (and/or row tags 136 of rows 123 in the table 121).

Figure 2:
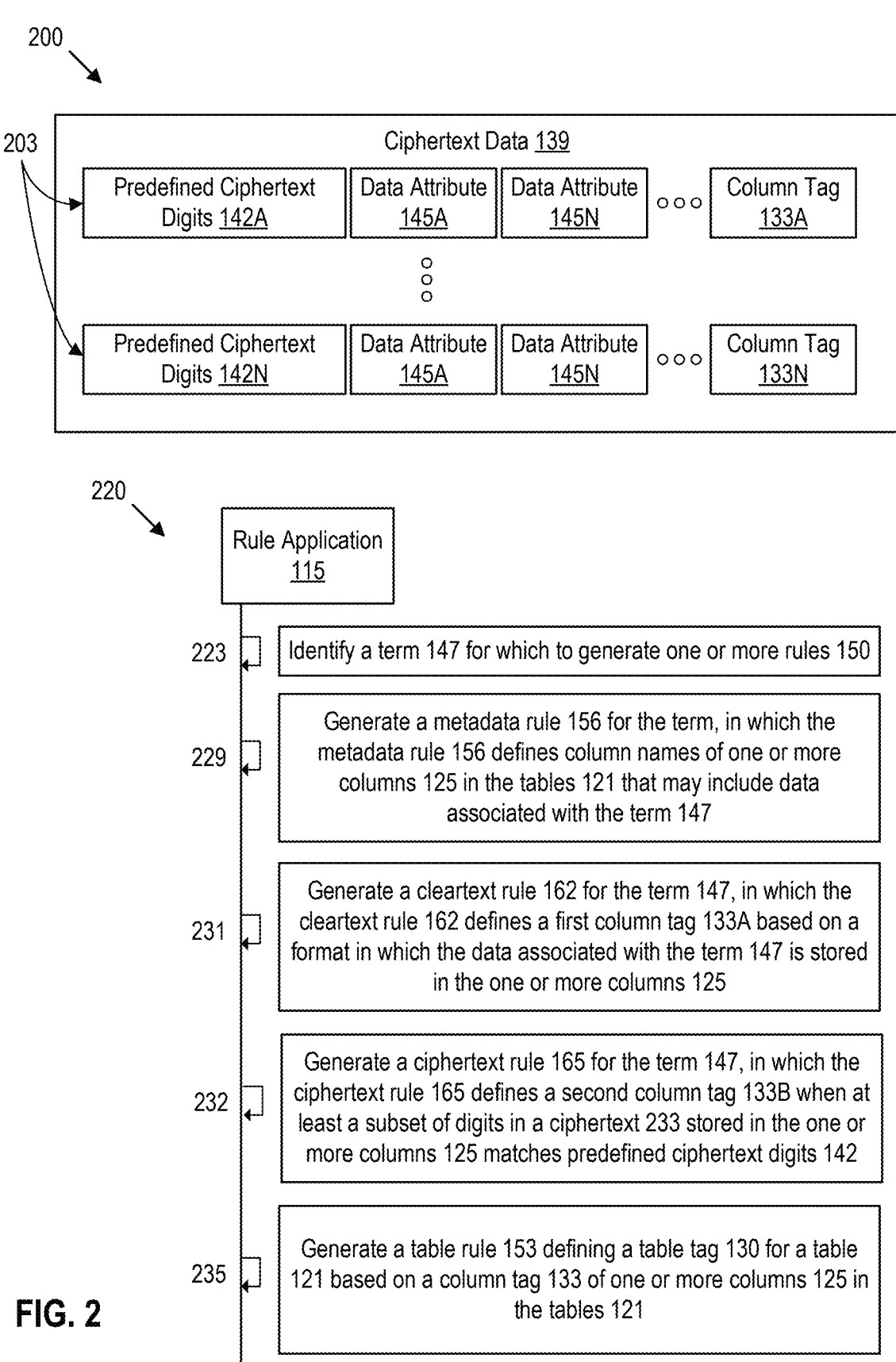
FIG. 2 is a diagram illustrating the generation of various rules for database tagging in the communication network of FIG. 1 according to various embodiments of the disclosure.

Referring now to FIG. 2, shown is a diagram 200 illustrating the generation of rules 150 for tagging the databases 106 in the communication network 100 of FIG. 1 according to various embodiments of the disclosure. FIG. 2 includes a representation of the ciphertext data 139 and a method 220 of generating rules 150 for tagging the databases 106 in the communication network 100.

The representation of the ciphertext data 139 shown in FIG. 2 includes a plurality of mappings 203. Each mapping 203 may include an association between predefined ciphertext digits 142A-N, corresponding data attributes 145A-N, and a column tag 133A-N. The predefined ciphertext digits 142A-N may each include a subset of digits from known ciphertext that may or may not be stored at the tables 121 in the databases 106. For example, the predefined ciphertext digits 142A-N may be five alphanumeric digits that may correspond to a suffix of ciphertext stored at the tables 121. The data attributes 145A-N for each of the predefined ciphertext digits 142A-N may include attributes that may be associated with ciphertext when the ciphertext includes the respective predefined ciphertext digits 142A-N. For example, the data attributes 145A-N may include data describing a purpose, type, and/or sensitivity of the underlying data that has been encrypted into the ciphertext (e.g., an environment of the ciphertext/underlying data (e.g., non-production environment or product requirements document), context of the underlying data, type of the underlying data, etc.). The data attributes 145A-N may also indicate the encryption key identifier of the encryption key used to encrypt the underlying data into the ciphertext, and the encryption algorithm identifier of the encryption algorithm used to encrypt the underlying data into ciphertext.

The column tags 133A-N may indicate an appropriate column tag 133A-N for a column 125 including ciphertext when the ciphertext includes the respective predefined ciphertext 142A-N having the associated data attributes 145A-N. For example, when a sample 127 of data in a column 125 includes ciphertext, all having a 5-digit suffix that matches predefined ciphertext digits 142A, then the rule application 115 may determine that the column 125 may be tagged with the corresponding column tag 133A. In this way, the ciphertext data 139 includes mappings 203 between predefined ciphertext digits 142A-N and associated column tags 133A-N, such that the rule application 115 may identify an appropriate column tag 133A-N for columns 125 with ciphertext (encrypted data).

Figure 6:
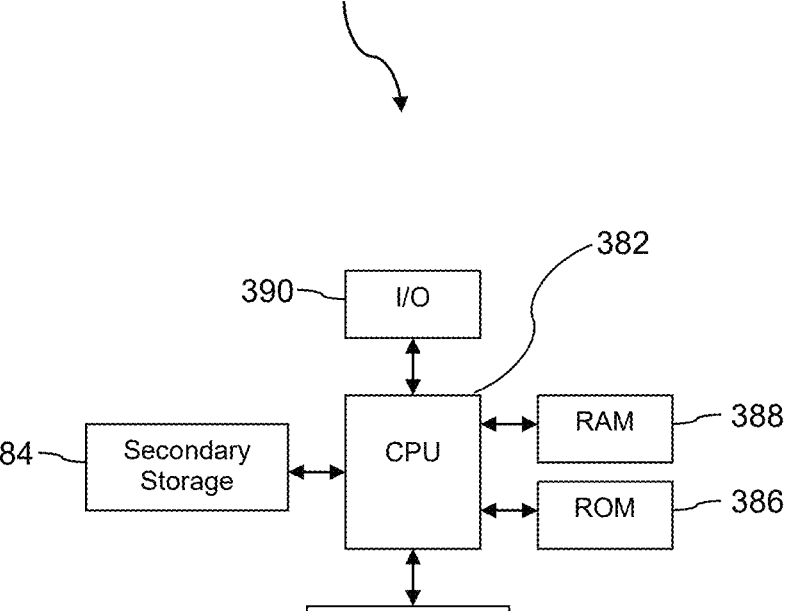
FIG. 6 is a block diagram of a computer system implemented within the communication network of FIG. 1 according to an embodiment of the disclosure.

Turning now to method 220 shown in FIG. 2, method 220 may be for generating different rules 150, which may be applied across the databases 106 to tag the tables 121, rows 123, and/or columns 125 across the databases 106. Method 220 may be performed by the rule application 115 of the database management system 103. In embodiments, the method 220 may be implemented using a computer system with components as shown in FIG. 6. As illustrated, method 220 of FIG. 2 includes a number of enumerated operations, but embodiments of the operations in FIG. 2 may include additional operations before, after, and in between the enumerated operations. In some embodiments, one or more of the enumerated operations may be omitted or performed in a different order.

At operation 223, the rule application 115 may identify a term 147 for which to generate one or more rule 150. For example, the database management system 103 may store a predefined library of terms 147 for different business enterprises/organizations or for different categories of business enterprises/organizations. In an embodiment, the rule application 115 may perform method 220 for each of the terms 147 in the library of terms 147 for a respective business enterprise/organization. As mentioned above, a term 147 refers to a specific category, purpose, or usage of data, and the databases 106 may include one or more data elements storing data (encrypted or not) relevant to the term 147.

At operation 229, the rule application 115 may generate one or more metadata rules 156 for the term 147. The metadata rule 156 may define, for example, column names of one or more columns 125 in the tables 121 at the databases 106 that may include data associated with the term 147 (metadata rules 156 may similarly be generated for rows 123 based on row names). The metadata rule 156 may also, in some cases, define column names that may exclude data associated with the term 147 (e.g., data that may include a variation of a column name, but includes a different type of data). The rule application 115 may generate the metadata rules 156 in various manners. For example, a user of the database management system 103 may provide the column names (e.g., via selection/typing at a user interface of the database management system 104) that are likely to be associated with a term 147. As another example, a machine learning model may be used to identify column names that are most likely to be associated with a term 147 (e.g., with a confidence score above a threshold). As yet another example, the library of terms 147 may indicate different types of data that may be stored in columns 125 having different column names across the tables 121. In either case, the rule application 115 may be programmed to generate the metadata rule 156 with the logic and conditions based on the received column names and the term 147.

At operation 231, the rule application 115 may generate one or more cleartext rules 162 for the term 147. The cleartext rule 162 may define, for example, a first column tag 133A for columns 125 carrying cleartext data that has not been encrypted. The cleartext rule 162 may define the first column tag 133A for a column 125 based on a format of a sample 127 of data received from the column 125. The format may refer to, for example, a number of digits, type of alphanumeric, dashes/periods/other character between the digits, etc. In some cases, cleartext rules 162 may similarly be generated for rows 123 when data in a row 123 is all of a similar format. The rule application 115 may have access to data describing the different formats in which a certain type of data (associated with the term 147) may be stored. For example, a user of the database management system 103 may provide one or more different formats in which the data associated with the term 147 may be stored in one or more columns 125. As another example, a machine learning model may be used to learn the different formats in which the data associated with the term 147 may be stored in one or more columns 125 (e.g., with a confidence score above a threshold). As yet another example, the library of terms 147 may be indicate the different types and formats of data that may be stored in columns 125 having different column names across the tables 121. In either case, the rule application 115 may be programmed to generate the cleartext rule 162 with the logic and conditions to identify a first column tag 133A based on the format of the data associated with the term 147.

At operation 232, the rule application 115 may generate one or more ciphertext rules 165 for the term 147. The ciphertext rule 165 may define, for example, a second column tag 133B for columns 125 carrying encrypted data in the form of ciphertext 233. The ciphertext rule 165 may define the second column tag 133B for a column 125 based on a sample 127 of ciphertext 233 received from the column 125, in which at least a subset of digits in the ciphertext 233 matches predefined ciphertext digits 142B mapped to the column tag 133B in the mappings 203 of the ciphertext data

139. In some cases, ciphertext rules 165 may similarly be generated for rows 123. The rule application 115 may have access to the ciphertext data 139, which may indicate the mappings 203 between predefined ciphertext digits 142A-N and column tags 133A-N, and which may be used by the rule application 115 to generate different ciphertext rules 165 for each of the different predefined ciphertext digits 142A-N. In this way, the rule application 115 may be programmed to generate the ciphertext rule 165 with the logic and conditions to identify the second column tag 133B based on the mappings 203 in the ciphertext data 139.

At operation 235, the rule application 115 may generate one or more table rules 153 defining a table tag 130 for a table 121. The rule application 115 may generate the table tag 130 based on, for example, whether the table 121 includes columns 125 that have been tagged with one or more predefined column tags 133A-N. For example, the rule application 115 may have access to metadata describing associations between different predefined column tags 133A-N and one or more table tags 130. In some cases, the mappings 203 in the ciphertext data 139 may also indicate table tags 130 for corresponding column tags 133A-N (e.g., as another entry in the mapping 203). In this way, the rule application 115 may be programmed to generate the ciphertext rule 165 with the logic and conditions to identify the second column tag 133B based on the mappings 203 in the ciphertext data 139.

Figure 3:
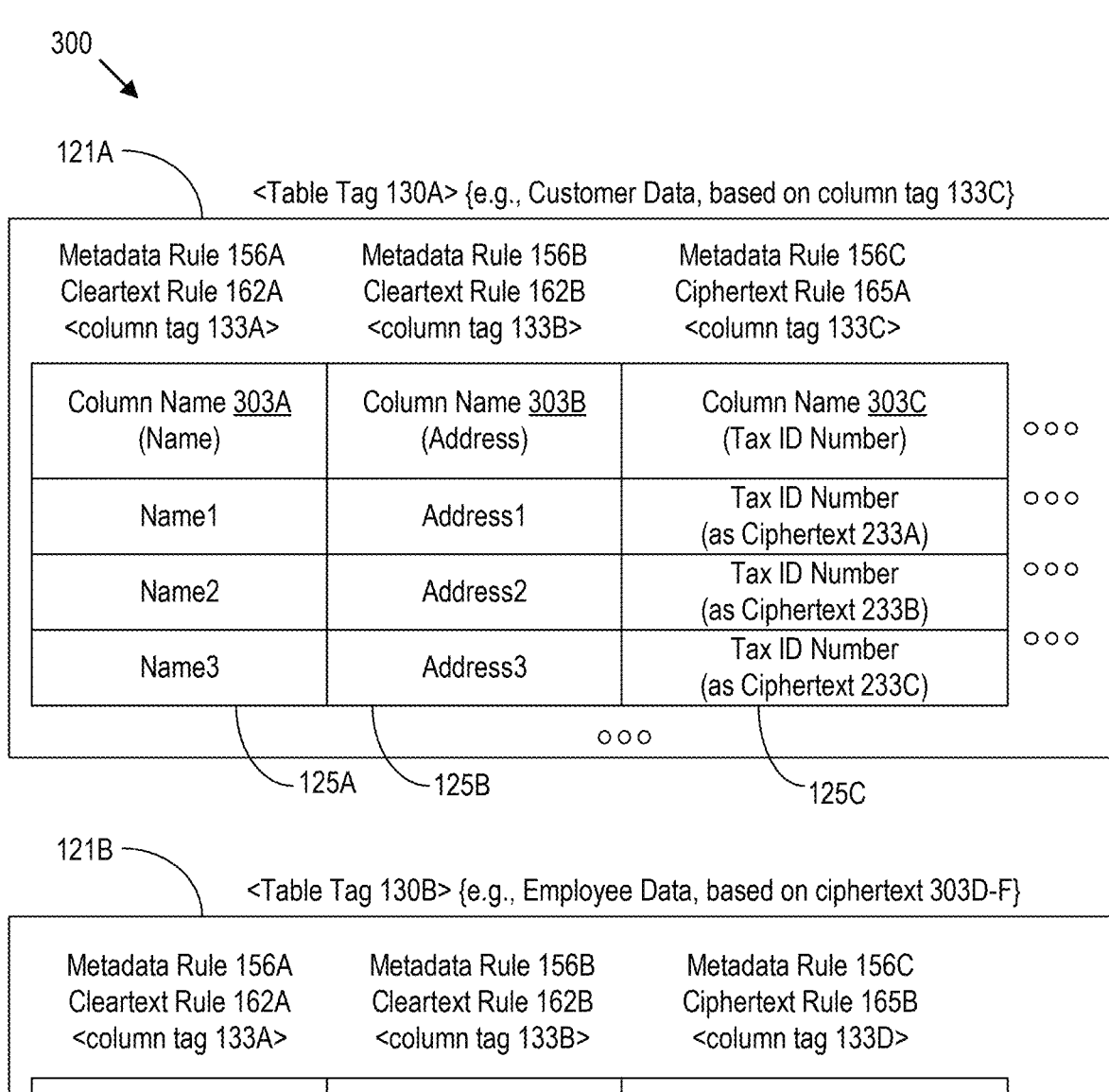
FIG. 3 is a diagram illustrating the tagging of tables and columns stored at databases in the communication network of FIG. 1 according to various embodiments of the disclosure.

Referring now to FIG. 3, shown is a diagram 300 illustrating the tagging of tables 121A-B and columns 125A-F stored at the databases 106 in the communication network 100 of FIG. 1 according to various embodiments of the disclosure. Table 121A includes three columns: column 125A having a column name 303A of "Name", column 125B having a column name 303B of "Address", and column 125C having a column name 303C of "Tax ID number." Table 121B also includes three columns: column 125D similarly having a column name 303A of "Name", column 125E similarly having a column name 303B of "Address", and column 125F similarly having a column name 303C of "Tax ID number." While tables 121A-B shown in FIG. 3 only include three columns 125 and four rows 123, it should be appreciated that tables 121A-B in the databases 106 may include any number of rows 123 and columns 125, and may even in some cases include sub-tables if appropriate.

In an embodiment, the tag application 118 at the database management system 103 may use the rules 150 (generated as described above in FIG. 2) to tag the columns 125A-F with column tags 133A-D. Tagging the columns 125A-F with column tags 133A-D may refer to associating an identifier (or pointer) of each of the columns 125A-F with a column tag 133A-D based on an applicable rule 150 for a term 147, and storing the association between the column 125A-F with the column tag 133A-D in the data store 109 (e.g., as tag metadata).

In an embodiment, the tag application 118 simultaneously or individually evaluate each column 125A-F in both tables 121A-B (both of which may be in the same database 106 or in different databases 106) to tag the columns 125A-F and the tables 121A-B. For example, the tag application 118 may begin with column 125A by applying different metadata rules 156 to the column name 303A of column 125A. Applying different metadata rules 156 to the column names 303A-C in the columns 125A-F until the conditions indicated in a metadata rule 156 are true (e.g., the metadata rule 156 passes) for a given term 147. In the example shown in FIG. 3, metadata rule 156A may pass, for example, based on the metadata rule 156A indicating the column name 303A of "Name" as being associated with data relevant to a term 147.

As mentioned above, each metadata rule 156 may be associated a term 147 and one or more value rules 159 (cleartext rules 162 and/or ciphertext rules 165). In this way, when the tag application 118 determines that a column 125A has satisfied a metadata rule 156A, the tag application 118 may then proceed to apply the value rules 159 associated with the term 147 (e.g., by applying the cleartext rules 162 first and the ciphertext rules 165 after, or vice-versa).

For example, the tag application 118 may apply a first cleartext rule 162 that is associated with the metadata rule 156A, and if that first cleartext rule 162 fails (e.g., the conditions are not true), then the tag application 118 may apply a next cleartext rule 162 that is associated with the metadata rule 156A, and so on, until the tag application 118 determines that a cleartext rule 162 passes (e.g., the conditions are true) with respect to the data in the column 125A. The tag application 118 may apply a cleartext rule 162A to a column 125A by taking a sample 127 of data from the column 125A and applying the conditions in the cleartext rule 162A to the sample 127 of data from the column 125A. When the conditions in the cleartext rule 162A are satisfied (or true) in the sample 127 of data from the column 125A, the tag application 118 may tag the column 125A with the column tag 133A of the cleartext rule 162A. The tag application 118 may store, in data store 109, the column tag 133A from the cleartext rule 162A in association with an identification (e.g., identifier or pointer) of the column 125A.

The tag application 118 may perform similar steps to apply different metadata rules 156 associated with one or more terms 147 to the column name 303B of column 125B to identify that the metadata rule 156B for the term 147 is satisfied/true. The tag application 118 may then proceed to apply the cleartext rules 162 associated with the metadata rule 156B to determine that a sample 127 of data from column 125B meets the conditions of cleartext rule 162B (i.e., the conditions in cleartext rule 162B are satisfied/true in view of the sample 127 of data from column 125B). The tag application 118 may then tag the column 125B with the column tag 133B of the cleartext rule 162B. The tag application 118 may store, in data store 109, the column tag 133B from the cleartext rule 162B in association with an identification of the column 125B.

The tag application 118 may then evaluate column 125C. First, the tag application 118 may apply different metadata rules 156 to the column name 303C ("Tax ID Number") of column 125C until the tag application 118 determines that the column name 303C meets the conditions in metadata rule 156C. The tag application 118 may then apply the value rules 159 corresponding to the metadata rule 156C to identify a column tag 133C for the column 125C.

To apply the value rules 159, the tag application 118 may first extract or obtain a sample 127 of the data in the column 125C. As shown in FIG. 3, the data in column 125C is encrypted as ciphertext 233A-C. That is, the tax ID numbers in column 125C are encrypted using an encryption key and an encryption algorithm, to obtain the ciphertext 233A-C stored in the column 125C. The ciphertext 233A-C may each include an encryption key identifier, an encryption algorithm identifier, and a subset of digits (e.g., prefix/suffix) that may or may not match predefined ciphertext digits 142 in the ciphertext data 139.

In an embodiment, the tag application 118 may first apply all of the associated cleartext rules 162 to the sample 127 of data from the column 125C. The cleartext rules 162 may not pass or be true since the ciphertext 233A-C in the sample 127 is all encrypted, and cleartext rules 162 may not apply to encrypted data (e.g., since cleartext rules 162 may only apply to cleartext, non-encrypted data). In this case, the tag application 118 may then proceed to apply the ciphertext rules 165 associated with the metadata rule 156C. In another embodiment, after determining that the sample 127 of data from the column 125C only contains encrypted data in the form of ciphertext 233A-C, the tag application 118 may ignore/skip over all of the cleartext rules 162 that do not apply to the data in the column 125C, and instead proceed straight to applying the ciphertext rules 165 associated with the metadata rule 156C.

The tag application 118 may iteratively or simultaneously apply each of the associated ciphertext rules 165 to the sample 127 of data from the column 125C, until the tag application 118 identifies that the ciphertext 233A-C in the sample 127 each includes a subset of digits that matches predefined ciphertext digits 142 indicated in a ciphertext rule 165A. The tag application 118 may then tag the column 125C with the column tag 133C indicated in the ciphertext rule 165A (that is stored in the mapping 203 with the matching predefined ciphertext digits 142A). The tag application 118 may store, in data store 109, the column tag 133C from the ciphertext rule 165A in association with an identification of the column 125C. In the example shown in FIG. 3, the predefined ciphertext digits 142 included in the ciphertext 233A-C are associated with the data attribute 145 of customer data, and thus the column tag 133C may be associated with customer data.

Turning now to table 121B, the tag application 118 may perform similar steps to identify that the column 125D meets the conditions for metadata rule 156A, and to determine that data in the column 125D meets the conditions of cleartext rule 162A. As such, the tag application 118 may then tag the column 125D with the column tag 133A indicated in the cleartext rule 162A. The tag application 118 may store, in data store 109, the column tag 133A from the cleartext rule 162A in association with an identification of the column 125D.

Similarly, the tag application 118 may perform similar steps to identify that the column 125E meets the conditions for metadata rule 156B, and to determine that data in the column 125E meets the conditions of cleartext rule 162B. As such, the tag application 118 may then tag the column 125E with the column tag 133B indicated in the cleartext rule 162B. The tag application 118 may store, in data store 109, the column tag 133B from the cleartext rule 162B in association with an identification of the column 125E.

The tag application 118 may perform steps similar to those described above with reference to column 125C to apply ciphertext rules 165 to a sample of data from column 125F (that includes encrypted tax ID numbers in the form of ciphertext 233D-F). The tag application 118 may iteratively or simultaneously apply each of the associated ciphertext rules 165 to the sample 127 of data from the column 125F, until the tag application 118 identifies that the ciphertext 233D-F in the sample 127 each includes a subset of digits that matches predefined ciphertext digits 142B of a ciphertext rule 165B. The tag application 118 may then tag the column 125F with the column tag 133D indicated in the ciphertext rule 165B (that is stored in the mapping 203 with the matching predefined ciphertext digits 142B). The tag application 118 may store, in data store 109, the column tag 133D from the ciphertext rule 165B in association with an identification of the column 125D. In the example shown in FIG. 3, the predefined ciphertext digits 142 included in the ciphertext 233D-F are associated with the data attribute 145 of employee data, and thus the column tag 133D may be associated with employee data.

Therefore, table 121A includes a column tag 133C associated with customer tag, while table 121 includes a column tag 133D associated with employee data. In an embodiment, the ciphertext data 139 may include a table tag 130A (e.g., <customer data>) based on the table 121A including a column 125C tagged with column tag 133C. The table tag 130A indicates that a table 121A with a column 125C having the column tag 133C stores data related to customers (i.e., the entire table 121A stores data related to customers). The applicable table rule 153 may thus indicate than when a table 121A has a column 125C tagged with the column tag 133C, the tag application 118 is to tag the table 121A with the table tag 130A.

Similarly, the ciphertext data 139 may include a table tag 130B (e.g., <employee data>) associated with column tag 133D based on the table 121B including a column 125F tagged with column tag 133D. The table tag 130B indicates that a table 121B with a column 125F having the column tag 133D stores data related to employees (i.e., the entire table 121B stores data related to employees). The applicable table rule 153 may thus indicate than when a table 121B has a column 125F tagged with the column tag 133D, the tag application 118 is to tag the table 121B with the table tag 130B.

In this way, the tag application 118 may use the column tags 133A-D (particularly the ciphertext-based column tags 133C and 133D) to determine a context of the tables 121A-B, or a general type of data stored at the tables 121A-B. Sometimes, tables such as tables 121A-B may essentially store the same types of data (e.g., names, addresses, and tax ID numbers), but the data stored at each of the tables 121A-B may be of completely different contexts (e.g., one table 121A may only store customer data, while the other table 121B may only store employee data). The context of tables 121A-B as a whole may not categorized due to the difficulty of doing so in tables such as tables 121A-B. However, the embodiments disclosed herein enable different tables 121A-B to be tagged with different table tags 130A-B reflecting the context/category of the data stored at the tables 121A-B.

The table tags 130A-B may be used for a variety of purposes (e.g., database management, responding to data queries, etc.) for more accurate and efficient management of data and responses. For example, the table tags 130A-B may be used to immediately identify data applicable to a response to a database query, without using the processing and power resources that may otherwise be used to evaluate the tables 121A-B. The table tags 130A-B may also be used to more efficiently perform table operations (e.g., join, deduplication, etc.) on the tables 130A-B, again by immediately identifying the type of data stored at the tables 121A-B.

Referring now to FIG. 4, shown is a method 400 of rule-based database management and tagging according to various embodiments of the disclosure. Method 400 may be performed by the database management system 103. In embodiments, the method 400 may be implemented using a computer system with components as shown in FIG. 6. As illustrated, method 400 of FIG. 4 includes a number of enumerated operations, but embodiments of the operations in FIG. 4 may include additional operations before, after, and in between the enumerated operations. In some embodiments, one or more of the enumerated operations may be omitted or performed in a different order.

At step 403, method 400 comprises maintaining, at a data store 109 in the communication network 100, ciphertext data 139 including mappings 203 between predefined ciphertext digits 142 and one or more data attributes 145. In an embodiment, the one or more data attributes 145 comprise at least one of an identification of an encryption key, an identification of an encryption attribute, or an identification of a type of data. At step 405, method 400 comprises identifying, by a rule application 115 executing at a database management system 103 in the communication network 100, a term 147 associated with data elements at one or more tables 121 in one or more databases 106 of the communication network 100. At step 407, method 400 comprises generating, by the rule application 115, a cleartext rule 162 for the term 147, in which the cleartext rule 162 defines a first column tag 133 based on a format in which data associated with the term 147 is stored in the one or more columns 125.

At step 409, method 400 comprises generating, by the rule application 115, a ciphertext rule 165 for the term 147, in which the ciphertext rule 165 defines a second column tag 133 when at least a subset of digits in a ciphertext 233 stored in the one or more columns 125 matches the predefined ciphertext digits 142. At step 411, method 400 comprises generating, by the rule application 115, a table rule 153 defining a table tag 130 for each of the one or more tables 121 based on the second column tag 133 of the one or more columns 125 at the one or more tables 121.

At step 413, method 400 comprises tagging, by a tag application 118 executing at the database management system 103, a column 125 at a table 121 with the second column tag 133 based on the ciphertext rule 165 and the ciphertext 233 included in the column 125 by storing the second column tag 133 in association with the column 125 in the data store 109. At step 415, method 400 comprises tagging, by the tag application 118, the table 121 with the table tag 130 based on the table rule 153 and the second column tag 133 of the column 125 in the table 121 by storing the table tag 130 in association with the table 121 in the data store 109. At step 417, method 400 comprises responding, by the tag application 118, to a database query using the table tag 130 and the second column tag 133.

Method 400 may include other steps and/or features that are not otherwise shown in FIG. 4. In an embodiment, the data elements comprise the one or more columns 125, one or more rows 123, and one or more samples 127 of data from the one or more tables 121, in which the samples 127 of data comprise encrypted data as the ciphertext 233. In an embodiment, method 400 may further comprise generating, by the rule application 115, a metadata rule 156 for the term 147, in which the metadata rule 156 defines column names 303 of one or more columns 125 at the one or more tables 121. In an embodiment, the column 125 at the one or more tables 121 is tagged with the second column tag 133 further based on the metadata rule 156 and a column name 303 of the column 125.

In an embodiment, responding, by the tag application 118, to the database query using the table tag 140 and the second column tag 133 comprises searching, by the tag application 118, table tags 130 stored in the data store 109 to determine that the table 121 stores data indicated in the database query, searching, by the tag application 118, column tags 133 stored in the data store 109 to determine that the column 125 stores the data indicated in the database query, and/or obtaining, by the tag application 118, a response to the database query based on data obtained from the table 121 and the column 125. In an embodiment, the database query was received from a client. In an embodiment, the method 400 may further comprise transmitting, by the tag application 118 to the requesting client, the response to the database query.

Referring now to FIG. 5, shown is a method 500 of rule-based database management and tagging according to various embodiments of the disclosure. Method 500 may be performed by the database management system 103. In embodiments, the method 500 may be implemented using a computer system with components as shown in FIG. 6. As illustrated, method 500 of FIG. 5 includes a number of enumerated operations, but embodiments of the operations in FIG. 5 may include additional operations before, after, and in between the enumerated operations. In some embodiments, one or more of the enumerated operations may be omitted or performed in a different order At step 503, method 500 comprises generating, by a rule application 115 executing at a database management system 103, a ciphertext rule 165 defining a column tag 133 when at least a subset of digits in a ciphertext 233 stored in a column 125 of a table 121 matches predefined ciphertext digits 142 associated with at least one of a first purpose, a first type, or a first sensitivity of data in the column 125. At step 505, method 500 comprises generating, by the rule application 114, a table rule 153 defining a table tag 130 when the table 121 includes the column 125 that is tagged with the column tag 133, in which the table tag 13—labels the table 121 as being associated with at least one of a second purpose, a second type, or a second sensitivity of table data in the table. At step 507, method 500 comprises tagging, by a tag application 118 executing at the database management system 103, the column 125 with the column tag 133 based on the ciphertext rule 165 and the table 121 with the table tag 130 based on the table rule 153. At step 509, method 500 comprises responding, by the tag application 118, to a database query using the table tag 130 and the column tag 133.

Method 500 may include other steps and/or features that are not otherwise shown in FIG. 5. In an embodiment, method 500 further comprises maintaining, in a data store 109, ciphertext data 139 including mappings 203 between the predefined ciphertext digits 142 and one or more data attributes 145, in which the one or more data attributes 145 comprise at least one of an identification of an encryption key, an identification of an encryption attribute, or an identification of the first purpose, the first type, or the first sensitivity of the column data. In an embodiment, method 500 may further comprise maintaining, in a data store 109, the column tag 133 in association with the column 125, and maintaining, in the data store 109, the table tag 130 in association with the table 121.

In an embodiment, method 500 may comprise generating, by the rule application 115, a cleartext rule 162 defining a second column tag 133 based on a format in which the column data is stored in the column 125. In an embodiment, method 500 may comprise generating, by the rule application 115, a metadata rule 156 defining column names 303 of one or more columns 125 storing the column data of at least one of the first purpose, the first type, or the first sensitivity. In an embodiment, the column 125 is tagged with the column tag 133 based on the ciphertext rule 165 and further based on the metadata rule 156.

FIG. 6 illustrates a computer system 380 suitable for implementing one or more embodiments disclosed herein. In an embodiment, database management system 103 may be implemented as the computer system 380. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method implemented in a communication network to perform database management and tagging, wherein the method comprises:

maintaining, at a data store in the communication network, ciphertext data including mappings between predefined ciphertext digits and one or more data attributes, wherein the one or more data attributes comprise at least one of an identification of an encryption key, an identification of an encryption attribute, or an identification of a type of data;

identifying, by a rule application executing at a database management system in the communication network, a term associated with data elements at one or more tables in one or more databases of the communication network, wherein the one or more tables each comprise one or more columns;

generating, by the rule application, a cleartext rule for the term, wherein the cleartext rule defines a first column tag based on a format in which data associated with the term is stored in the one or more columns;

generating, by the rule application, a ciphertext rule for the term, wherein the ciphertext rule defines a second column tag when at least a subset of digits in a ciphertext stored in the one or more columns matches the predefined ciphertext digits, and wherein the ciphertext comprises encrypted data;

generating, by the rule application, a table rule defining a table tag for each of the one or more tables based on the second column tag of the one or more columns at the one or more tables;

tagging, by a tag application executing at the database management system, a column at a table with the second column tag based on the ciphertext rule and the ciphertext included in the column by storing the second column tag in association with the column in the data store;

tagging, by the tag application, the table with the table tag based on the table rule and the second column tag of the column in the table by storing the table tag in association with the table in the data store; and responding, by the tag application, to a database query using the table tag and the second column tag.

2. The method of claim 1, wherein the data elements comprise the one or more columns, one or more rows, and one or more samples of data from the one or more tables, and wherein the samples of data comprise encrypted data as the ciphertext.

3. The method of claim 1, further comprising generating, by the rule application, a metadata rule for the term, wherein the metadata rule defines column names of one or more columns at the one or more tables.

4. The method of claim 3, wherein the column at the one or more tables is tagged with the second column tag further based on the metadata rule and a column name of the column.

5. The method of claim 1, wherein responding, by the tag application, to the database query using the table tag and the second column tag comprises:

searching, by the tag application, table tags stored in the data store to determine that the table stores data indicated in the database query;

searching, by the tag application, column tags stored in the data store to determine that the column stores the data indicated in the database query; and obtaining, by the tag application, a response to the database query based on data obtained from the table and the column.

6. A database management system, comprising:

a data store comprising ciphertext data including mappings between predefined ciphertext digits and one or more data attributes, wherein the one or more data attributes comprise at least one of an identification of an encryption key, an identification of an encryption attribute, or an identification of a type of data;

one or more non-transitory memories;

one or more processors coupled to the one or more memories;

a rule application stored at one or more of the one or more memories, which when executed by one or more of the one or more processors, causes the rule application to be configured to:

identify a term associated with data elements at one or more tables in one or more databases, wherein the one or more tables each comprise one or more columns;

generate a cleartext rule for the term, wherein the cleartext rule defines a first column tag based on a format in which data associated with the term is stored in the one or more columns;

generate a ciphertext rule for the term defining a second column tag when at least a subset of digits in a ciphertext stored in the one or more columns matches the predefined ciphertext digits associated with a type of data, wherein the ciphertext comprises encrypted data;

generate a table rule defining a table tag for each of the one or more tables based on the second column tag when the one or more table includes the one or more columns that are tagged with the second column tag; and a tag application stored at one or more of the one or more memories, which when executed by one or more of the one or more processors, causes the tag application to be configured to:

tag a column at a table with the second column tag based on the ciphertext rule and the ciphertext included in the column by storing the second column tag in association with the column in the data store;

tag the table with the table tag after the column is tagged with the column tag based on the table rule and the second column tag of the column in the table by storing the table tag in association with the table in the data store; and responding to a database query using the table tag and the second column tag.

7. The database management system of claim 6, wherein the rule application is further configured to generate a metadata rule defining possible column names for the column storing a predefined type of data.

8. The database management system of claim 6, wherein the ciphertext includes a plurality of digits, and wherein the subset of digits in the ciphertext is a suffix of the ciphertext or a prefix of the ciphertext.

9. The database management system of claim 8, wherein the ciphertext includes an identifier of an encryption key and an identifier of an encryption algorithm performed on underlying data to obtain the ciphertext.

10. The database management system of claim 6, wherein the ciphertext rule indicates that when the ciphertext in the one or more columns includes the predefined ciphertext digits as a suffix of the ciphertext, the one or more columns store data elements of the type of data, and the one or more columns are to be tagged with the second column tag.

11. The database management system of claim 6, wherein the table tag indicates at least one of customer data or employee data.

12. The database management system of claim 6, wherein the table tag is a label or metadata describing at least one of a purpose, type, or sensitivity of data in the table.

13. The database management system of claim 6, wherein the second column tag is a label or metadata describing at least one of a purpose, type, or sensitivity of data in the column.

14. A method, comprising:

maintaining, at a data store, ciphertext data including mappings between predefined ciphertext digits and one or more data attributes, wherein the one or more data attributes comprise at least one of an identification of an encryption key, an identification of an encryption attribute, or an identification of a type of data;

identifying, by a rule application executing at a database management system, a term associated with data elements at one or more tables in one or more databases of the communication network, wherein the one or more tables each comprise one or more columns;

generating, by the rule application, a cleartext rule for the term, wherein the cleartext rule defines a first column tag based on a format in which data associated with the term is stored in the one or more columns;

generating, by the rule application, a ciphertext rule for the term defining a second column tag when at least a subset of digits in a ciphertext stored in the one or more columns matches the predefined ciphertext digits associated with at least one of a first purpose, a first type, or a first sensitivity of column data in the one or more columns;

generating, by the rule application, a table rule defining a table tag for each of the one or more tables based on the second column tag when the one or more tables include the one or more columns that are tagged with the second column tag, wherein the table tag labels the one or more tables as being associated with at least one of a second purpose, a second type, or a second sensitivity of table data in the table;

tagging, by a tag application executing at the database management system, a column at a table with the second column tag based on the ciphertext rule and the ciphertext included in the column by storing the second column tag in association with the column in the data store;

tagging, by the tag application, the table with the table tag based on the table rule and the second column tag of the column in the table by storing the table tag in association with the table in the data store; and responding, by the tag application, to a database query using the table tag and the second column tag.

15. The method of claim 14, wherein the one or more data attributes comprise at least an identification of the first purpose, the first type, or the first sensitivity of the column data.

16. The method of claim 14, further comprising:

maintaining, in the data store, the second column tag in association with the column; and maintaining, in the data store, the table tag in association with the table.

17. The method of claim 14, further comprising generating, by the rule application, a metadata rule defining column names of at least one column storing the column data of at least one of the first purpose, the first type, or the first sensitivity.

18. The method of claim 17, wherein the column is tagged with the second column tag based on the ciphertext rule and further based on the metadata rule.

19. The method of claim 14, wherein responding, by the tag application, to the database query using the table tag and the second column tag:

searching, by the tag application, table tags stored in the data store to determine that the table stores data indicated in the database query; and searching, by the tag application, column tags stored in the data store to determine that the column stores the data indicated in the database query.

* * * * *